(12) United States Patent (10) Patent No.: US 7,551,571 B2
Goldberg et al. (45) Date of Patent: Jun. 23, 2009

(54) TECHNOLOGY FOR IMPROVING STP PROTOCOLS IN ETHERNET NETWORKS SUPPORTING VLANS

(75) Inventors: Noam Goldberg, Tel-Aviv (IL); Igor Balter, Ashdod (IL); Idan Kaspit, Rosh Ha'ayin (IL)

(73) Assignee: ECI Telecom Ltd., Petach-Tikva (IL)

( * ) Notice: Subject to any disclaimer, the term of this patent is extended or adjusted under 35 U.S.C. 154(b) by 1029 days.

(21) Appl. No.: 10/824,378

(22) Filed: Apr. 15, 2004

(65) Prior Publication Data

US 2004/0218551 A1 Nov. 4, 2004

(30) Foreign Application Priority Data

Apr. 15, 2003 (IL) ..................................... 155449

(51) Int. Cl.
*H04L 12/28* (2006.01)
*H04L 12/56* (2006.01)
*G06F 15/173* (2006.01)

(52) U.S. Cl. ........................ 370/256; 370/401; 370/408; 709/239

(58) Field of Classification Search ......... 370/221–256, 370/352–389, 401–466; 709/220–239
See application file for complete search history.

(56) References Cited

U.S. PATENT DOCUMENTS

| | | | |
|---|---|---|---|
| 6,188,694 B1 | 2/2001 | Gai et al. | |
| 6,515,969 B1 | 2/2003 | Smith | |
| 6,678,241 B1* | 1/2004 | Gai et al. | 370/216 |
| 6,882,630 B1* | 4/2005 | Seaman | 370/256 |
| 6,898,189 B1* | 5/2005 | Di Benedetto et al. | 370/256 |
| 6,934,262 B1* | 8/2005 | Lau et al. | 370/256 |
| 6,934,263 B1* | 8/2005 | Seaman | 370/256 |
| 6,954,437 B1* | 10/2005 | Sylvest et al. | 370/256 |
| 6,985,449 B2* | 1/2006 | Higashiyama | 370/256 |
| 6,987,740 B1* | 1/2006 | Di Benedetto et al. | 370/256 |
| 7,027,453 B2* | 4/2006 | Lui et al. | 370/408 |
| 7,061,875 B1* | 6/2006 | Portolani et al. | 370/256 |
| 7,126,923 B1* | 10/2006 | Yang et al. | 370/256 |
| 2004/0190454 A1* | 9/2004 | Higasiyama | 370/238 |

OTHER PUBLICATIONS

Wang Z et al, "Quality of service routing for supporting multimedia applications" (IEEE Journal on Selected Areas in Communications (Sep. 1996) pp. 1228-1234.

* cited by examiner

*Primary Examiner*—Man Phan
(74) *Attorney, Agent, or Firm*—Browdy and Neimark

(57) ABSTRACT

A method for utilizing a Spanning Tree Protocol (STP) in an Ethernet network wherein a number of VLANs are defined and a plurality of Ethernet switching nodes (A, B, C D E, F,G H) are interconnected via their ports (A1, . . . ,H4) so that each of the ports is initially assigned to one or more VLANs, and each of the VLANs is intended to enable traffic between two or more edge ports (D3, B3). The method comprises a so-called pruning procedure initiated upon establishing a new STP topology (30) related to one or more VLANs. This procedure concerns a broadcast domain of at least one of the VLANs and is aimed at obtaining a sub-tree for each pruned VLAN in the new STP topology. The sub-tree is usually shrunk, bound by the edge ports assigned to the corresponding pruned VLAN, and thus eliminates broadcast traffic of the pruned VLAN to any Ethernet switch extending beyond the obtained sub-tree.

16 Claims, 2 Drawing Sheets

TECHNOLOGY FOR IMPROVING STP PROTOCOLS IN ETHERNET NETWORKS SUPPORTING VLANS

FIELD OF THE INVENTION

The technology relates to Ethernet networks supporting VLANs and utilizing a Spanning Tree Protocol in its various versions.

BACKGROUND OF THE INVENTION

As part of the background description, the following terms are to be briefly explained:

STP—Spanning Tree Protocol (including its various standard variations such as STP—IEEE 802.1D, RSTP-802.1w, or MSTP-802.1s), is standard for protection and loop prevention in Ethernet communication networks. The STP recalculates the active topology in case of faults or reconfiguration. The STP also determines the active topology (STP network topology) to carry traffic upon initialization. According to STP, any network can logically be represented in the form of one or more interconnected trees—STP trees. An Ethernet network may be covered by a single STP tree; one STP tree may be provided per one VLAN; one STP tree may cover a group of VLANs.

VLAN—Virtual Local Area Network forming a logical partitioning of an Ethernet network (e.g. as defined per IEEE 802.Q) and defining a broadcast domain, within the Ethernet network;

GVRP—Generic VLAN Registration Protocol—Protocol for dynamically registering/provisioning or deregistering VLANs on a per VLAN basis.

Switching node—(or Ethernet switch or bridge) a network node having a number of ports for receiving and transmitting data frames.

Forwarding port—a port of a switching node being presently active, according to a presently actual STP topology, to receive data frames and forward them to one or more other ports of this or another node.

Ports assigned to a particular VLAN—ports of a switching node which, according to a selected service, are predestined for transmitting data packets to/from the particular VLAN.

Forwarding port—a port of a switching node

Edge port—a port that is on the boundary of an STP/VLAN domain; the edge port is considered a permanently forwarding port.

FDB—Filtering database—a standard database of MAC addresses in an Ethernet switching node, which is self-learned i.e., gradually formed during operation and based on registering source addresses from which data frames arrive to particular ports, thereby FDB "learns" the network for facilitating further switching decisions.

PDU—(Protocol Data Unit) a management message in any of the concerned protocols such as STP, GVRP, or the proposed below technique/protocol.

Spanning Tree Protocol (STP) is widely used for loop prevention and protection in Ethernet switched networks. Ethernet switches (nodes) forming ring or mesh networks might be connected to Local Area Networks (LANs) or end stations. A LAN may also comprise a number of Ethernet switches, where some support terminal/access ports (i.e. those directly connected to a LAN end-station or to those on the boundary of one STP domain to another). For increasing the scalability of Ethernet switched networks, also utilized are so-called Virtual Local Area Networks (VLANs). A number of VLANs are usually defined in the network.

VLANs may overlap one another, and normally, each particular VLAN must span each Ethernet switch that may be encountered in a path from one terminal to another, in any possible topology that may be imposed by the STP. Such a configuration of VLANs will be further called initial VLANs configuration. In many cases it can be that the initial configuration requires that all VLANs are provisioned on all ports throughout the network that are not edge ports. VLANs can be configured on the Ethernet network by GVRP or a management interface such as SNMP.

U.S. Pat. No. 6,515,969 relates to a method and apparatus for disseminating Virtual Local Area Network (VLAN) membership information across computer networks defining multiple spanning trees, which is hereby incorporated by reference. An intermediate network device includes a plurality of ports and a plurality of spanning tree engines each associated with one or more VLAN designations defined within the network. The spanning tree engines transition the ports among a plurality of port states, including a forwarding state and a blocked state. For each port, a separate Generic Attribute Registration Protocol (GARP) participant is also established and each GARP participant includes a multiple spanning tree (MST) GARP VLAN Registration Protocol (MST-GVRP) application component and an associated GARP Information Declaration (GID) component. The MST-GVRP application components cooperate to define a plurality of GARP Information Propagation (GIP) contexts each of which is associated with a spanning tree engine and thus its one or more VLAN designations. The technology described in the U.S. Pat. No. 6,515,969 relates to establishing the network topology whenever required, no optimization or special provisions for topology change and transition periods are mentioned. Also, the patent does not describe any solution for reducing broadcast traffic within a VLAN.

For addressing a particular data packet (frame) from a source node to a destination node, protocol for Ethernet networks supporting VLANs (IEEE 802.Q) requires that the data frame carry indication of a specific VLAN to which both the source and the destination node(s) belongs. According to the basic approach, Ethernet switches, passing there-through a data packet which is not addressed to a known MAC address but carries indication of a specific VLAN, performs "flooding" of all its output ports assigned to that VLAN. Thus, all the relevant neighboring nodes are enabled to continue checking and forwarding that packet for the specified VLAN and, if indicated and known within the switch, to the specified destination MAC address.

As mentioned, any Ethernet switch supports the Filtering Database (FDB) which is gradually formed by recording the source address indicated in a data packet (i.e. Ethernet frame) when the frame is received by one of the ports. A frame arriving to the switch and destined to a specific unicast MAC address that exists in the FDB, is not broadcasted to all output ports of the node, but is switched to a particular port as presently known to the switch with respect to that address. Therefore, the FDB allows reducing excessive flooding of traffic in the network.

It should be noted that an STP protocol, when applied to Ethernet switched network, creates a so-called "logical cut" in each cycle/ring, to impose an active tree topology. Consequently, all FDB information must take into account the given STP tree structure. If a fault occurs in any span of the structure, the STP protocol urgently reacts to that and recalculates the tree structure(s). The recalculation of the Spanning Tree results in a different network topology which, of course, will dictate other switched paths between those source nodes and destination nodes which are usually in communication. Significant portions of the FDBs supported by the switches associated with the changed STP tree topology are deleted as soon as the topology is changed. The changes in the STP topology cannot be processed immediately so, at the beginning, a huge amount of traffic is broadcasted or flooded at the switching nodes of the network (since a significant part of the FDB or the complete information previously recorded by FDB is deleted and new information is not yet collected).

SUMMARY OF THE INVENTION

It is therefore the object of the present invention to reduce unneeded traffic load (broadcasted traffic, flooded traffic) in an Ethernet network during and after transition (learning) periods caused by initialization or change of an STP network topology.

It should be noted that an STP topology change may be triggered by establishing the initial network topology, by one or more faults in the network, or by any "topology affecting" modification of STP parameters performed by an operator (both logical and physical modifications).

The object can be achieved by providing a method for utilizing and enhancing an STP protocol to be supported by an Ethernet network wherein a number of VLANs are defined and a plurality of Ethernet switching nodes are interconnected via their ports so that each of the ports is initially assigned to one or more VLANs, and each of the VLANs is intended to enable traffic between two or more access/edge ports;

the method, upon establishing a new STP topology related to one or more VLANs, initiates pruning the broadcast domain of at least one of said one or more VLANs to obtain at least one VLAN-related sub-tree of the new STP topology, the VLAN-related sub-tree being bound by access/edge ports assigned to its corresponding VLAN, the method thereby substantially reducing broadcasted and flooded traffic in the network.

More exactly, as a result of the proposed method, the broadcast traffic can only be detected at those Ethernet switch nodes which belong to the VLAN-related sub-tree obtained owing to the pruning procedure. No broadcast traffic of the pruned VLAN will be detected beyond the sub-tree. In other words, the method eliminates broadcast traffic of each said pruned VLAN beyond its obtained sub-tree.

The sub-tree is usually the only possible path or connection between the edge ports in the new STP topology (being also a tree structure).

In the simplest case, the sub-tree is a path defined by two edge ports forming its end points.

The object of the invention can be achieved if the following step is performed upon establishing the new STP topology in the network:

transmitting at least one de-activation message from at least one Ethernet switching node participating in the new STP topology to a neighbor Ethernet switching node also participating in the new STP topology, the message indicating: one or more VLANs de-activated with respect to a port transmitting said message, so as to allow said one or more VLANs be de-activated with respect to a port receiving said message, said at least one message allowing cancellation of redundant portions of the new STP network topology with respect to said one or more VLANs by pruning the broadcast domains of said one or more VLANs, thereby optimizing the STP network topology and reducing useless data traffic of said VLANs in the network.

More particularly, the method comprises the following steps to be performed at each particular Ethernet switching node participating in the new STP topology and with respect to each of said VLANs:
a) ensuring that ports of the Ethernet switching node participating in the new STP topology are assigned to said one or more VLANs according to an initial VLANs configuration;
b) counting forwarding ports assigned to a particular VLAN, being active according to the new STP topology;
c) if a port assigned to a particular VLAN is a single forwarding port of said particular VLAN at said node, de-activating said port with respect to said VLAN, thereby pruning said VLAN at said port and said node;
d) generating said de-activation message from each said single forwarding (de-activated) port of said node and performing said step of transmitting said de-activation message to a neighbor Ethernet switching node in the new STP topology;
e) de-activating the port of the neighbor Ethernet switch, that has received said de-activation message, with respect to said one or more VLANs indicated in the message;
f) repeating the method from step (b) at said neighbor node.

The sub-step (a) means that the initial VLAN configuration is guaranteed by default for the initial establishing of the network, but should be restored in case a new STP topology change has taken place after the pruning had been performed to a previous STP topology. Owing to that, the performed pruning does not introduce any cuts that would affect traffic once a new topology occurs.

As can be seen, the method reduces, one by one, so-called dead-end ports and nodes of the new STP topology with respect to one or more VLANs, thereby pruning VLANs in the Ethernet network to eliminate excessive data traffic in the network upon establishing the new STP topology.

The method is also applicable to the case where the new STP topology is the initial STP topology in the Ethernet network. The method will thus allow using of any non-optimized version of the initial network topology definition; the proposed VLAN pruning protocol will perform the network topology optimization with respect to VLANs configured by any suitable means, such as GVRP or a management interface such s SNMP.

The counting step relies on the consideration that edge ports are permanently forwarding ports.

Further preferably, said de-activation message is a PDU (protocol Data Unit) message utilized in Ethernet frame networks. The proposed PDU is provided with indication of one or more particular VLANs which are pruned at the port (with respect to which said port is temporary de-activated—i.e., until the next topology change).

In the simplest case, the de-activation (PDU) message comprises indication of a single particular VLAN de-activated (pruned) at a particular port, so that each additional VLAN, if de-activated at the same port, will be indicated in an additional separate PDU generated by the node on behalf of the single forwarding port.

However, the proposed protocol may be capable of generating a combined de-activation message listing all VLANs previously assigned at a particular port and de-activated (pruned) at the port owing to the steps b, c, d, e (i.e., all VLANs for which this port is a "single forwarding port"). Such combined messages create less traffic in the network, though require more time for generating and processing at any further switching node; it is understood since, for creating a combined message, complete "pruning" information on all VLANs and all ports in the node should be collected.

In general, the method can be started at a switching node upon receiving a Topology Change Notification (TCN) (signaling that, say, a present STP topology is being changed to the new STP topology, or a new topology is just initially created), and after expiring a predetermined (standard STP) topology change timer.

TCN is usually initiated across the Ethernet switched network by some fiber cut in a link between switching nodes, by other one or more faults in a link or in a switching node, by configuration changes and/or initialization.

In practice, upon receiving the TCN and expiring the timer, the process of pruning starts at so-called "leaf nodes" of the new STP topology, since by definition each leaf node is assigned to some VLANs at a single forwarding port (this port shall be the root port). At each node that is not a leaf node, the method will actually be started after receiving at least one de-activation message.

The pruning of a VLAN at a particular node prevents the node from receiving and forwarding data packets (frames) associated with said VLAN, and thus the VLANs pruning performed on the whole network with respect to all ports and LANs of a new topology drastically reduces the volume of unneeded traffic, mostly—the volume of uselessly broadcasted traffic and the traffic of the Ethernet frames flooding all ports of a switching node during the learning process.

It should be emphasized that the proposed technique not only allows quick reducing of useless flooding during the learning process, but also enables reducing the transmission of broadcast packets throughout a particular VLAN after the learning period, which result cannot be achieved by any of the known protocols.

The proposed method of improving the STP protocol actually constitutes an additional (supplementary) protocol which can be used to extend a standard STP protocol supported by the Ethernet network. Alternatively and preferably, it may form an integral part or an optional feature of a standard STP protocol.

The supplementary protocol may form part of a software product being intended for an Ethernet switch; said software product being, for example, implemented as embedded software of an Ethernet switch and run on said switch in an Ethernet network, allows performing the above-defined method.

Yet another aspect of the present invention is an Ethernet switch provided with the above software product (say, in the form of a suitable embedded software) and thus capable of performing the mentioned method in an Ethernet network.

BRIEF DESCRIPTION OF THE DRAWINGS

The present invention will be further described and illustrated with reference to the following non-limiting drawings, in which.

DETAILED DESCRIPTION OF THE INVENTION

Figure 1:
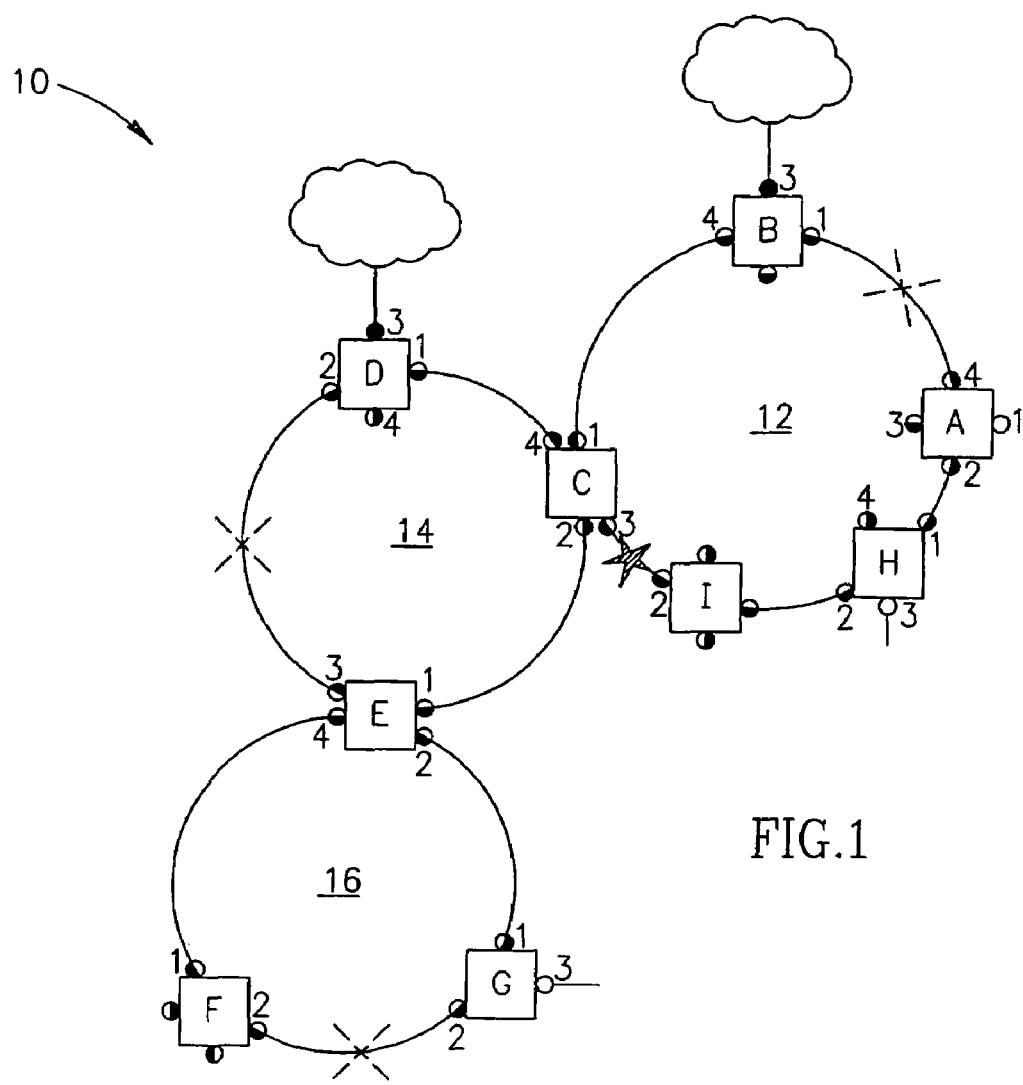
FIG. 1 schematically illustrates an exemplary network and ports of switching nodes which may be assigned to one or more VLANs, depending on a required grouping of access ports.

FIG. 1 schematically illustrates an Ethernet network 10 comprising three interconnected ring networks 12, 14 and 16 including Ethernet switching nodes A, B, C, D, E, F, G, H, I. Each switching node is shown as a square. Ports of the nods are shown by circles and numbered 1, 2, 3 and 4. Let the network 10 support a standard STP protocol. Since the STP protocol logically represents any ring network as a broken ring (i.e., creates a logical cut), such exemplary logical cuts are marked by dotted lines on spans AB, DE and GF. Let the network 10 define two VLANs: VLAN1 for creating possible paths in the network between access edge port D3 and access edge port B3, and VLAN2 for creating possible paths between node/port G3 and node/port H3.

Note that under normal operational policy each VLAN must be initially configured so that to be able to support connectivity between access/edge ports for each possible spanning tree active topology (Initial VLAN configuration).

Let all ports of the network nodes be assigned both to the VLAN1 (marked by black semi-circles) and VLAN2 (marked by white semi-circles), except for:

ports number 3 of nodes B and D which are the edge ports of the VLAN1 and marked by the whole black circle and therefore assigned only to VLAN1;

ports number 3 of nodes G and H being the edge ports of VLAN2 (marked by the whole white circles) and therefore assigned only to VLAN2.

It should be noted that VLAN1 does not need to be configured at ports and switches associated with ring 16 since it is not encountered in the path of B3 to D3 in any possible topology that may be imposed by STP in this network. However, it will be shown that even in the case that VLAN1 has the illustrated redundant configuration, the proposed technique allows its optimization.

Figure 2:
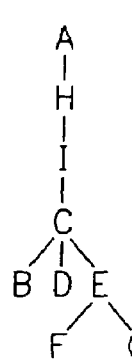
FIG. 2 schematically illustrates the initial STP network topology (the logical topology).

FIG. 2 illustrates an STP tree 20 (the existing STP topology) created by the STP protocol on the network 10, taking into account the logical cuts (dotted crosses) on the spans AB, DE and GF.

VLAN1 Ethernet packets transmitted between edges D3 and B3 will gradually find the only possible path D-C-B (black colored circles and semicircles).

Similarly, for VLAN2 packets sent from node G to node H, the following path will be gradually learnt via the ports assigned to VLAN2 (white colored circles and semicircles): G_E_C_I_H.

It can be understood that the learning process involves a lot of useless broadcasting in the network, until FDBs of the switching nodes are formed.

Figure 3:
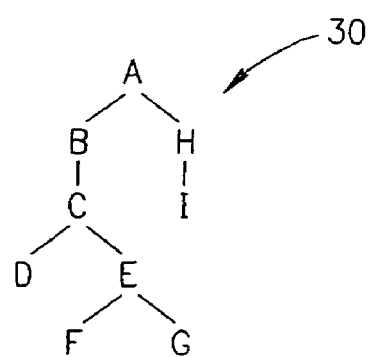
FIG. 3. illustrates a network topology changed by the STP protocol after a fiber cut has been detected in one part of the network.

Now, let a complete fiber cut occur between the nodes C and I (marked by a star in FIG. 1), so the initial STP topology must be changed. Let, for example, the STP now create the logical cut of the ring network 12 at the place of the real fiber cut, i.e., between the nodes C and I. Simultaneously, the ports B1 and A4 which were inactive in the previous topology, are considered active, i.e. the VLANs initial configuration is restored. The changed STP topology (tree) 30 is shown in FIG. 3. It should be noted, that FDBs are partially or completely deleted when the network topology changes. Apparently, paths for the Ethernet packets which are still bi-directionally sent between node D and node B, and between node G and node H will now change due to the changed network topology.

Again, the learning process will take a considerable time during which the Ethernet packets are uselessly broadcasted over the network.

Figure 4A:
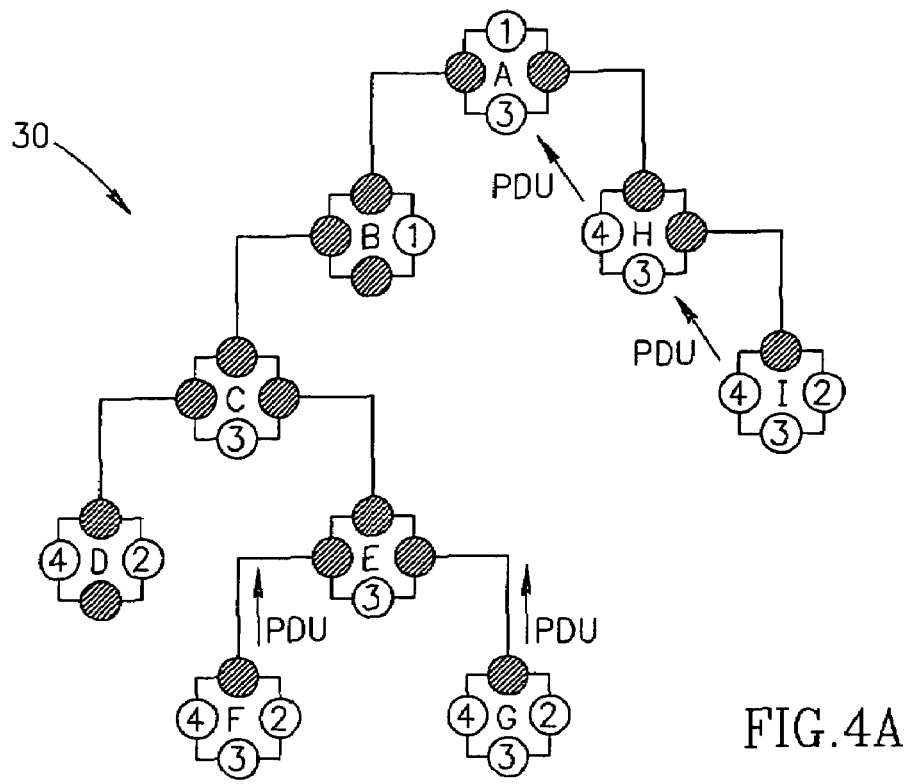
FIGS. 4a, 4b schematically illustrate how the proposed protocol for VLAN pruning works, the diagram is a portion of an STP tree reflecting the STP topology with respect to a particular VLAN before and after the pruning takes place.
Figure 4B:
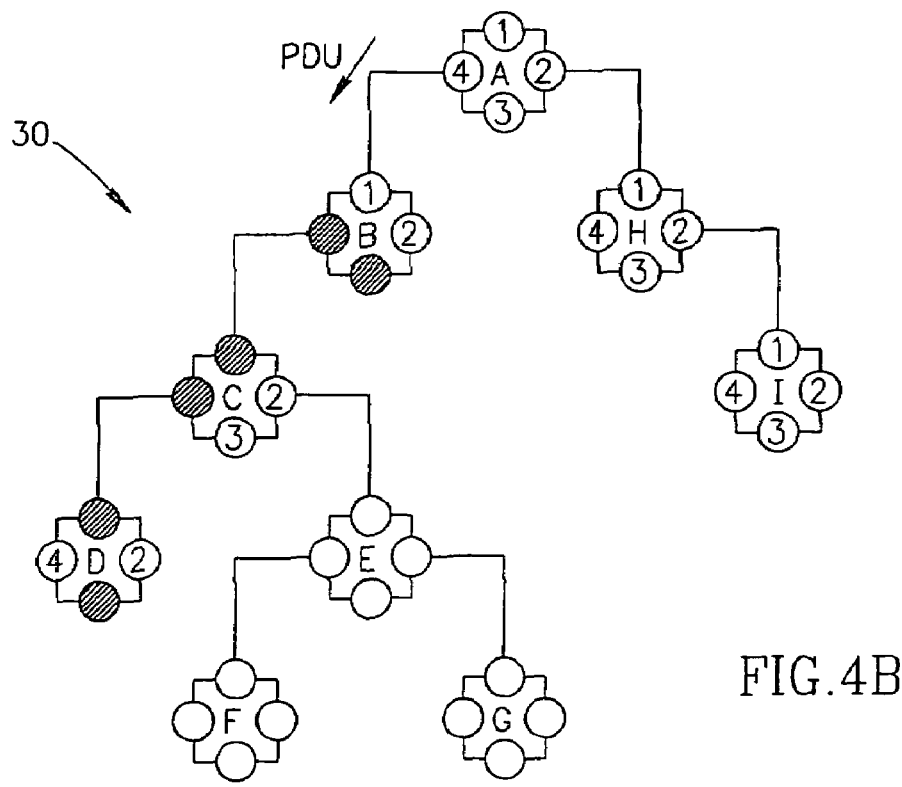

To prevent this ineffective use of the network bandwidth, the Inventors propose a supplementary protocol which will be illustrated with the aid of FIGS. 4a and 4b.

The function of the proposed protocol is to perform optimization of VLANs in a newly established STP network topology by deactivating those ports which do not need to serve for a given VLAN in the new (or changed) STP topology.

Deactivating of the VLANs on ports is triggered by TCN & topology change timer expiry at so-called leaf nodes of the STP spanning tree, since at first (as soon as the topology change takes place) only leaf nodes may support a single forwarding port assigned to any VLAN, and such port is a typical dead-end port. The protocol proceeds by checking each of the switching nodes having at least one port assigned to a particular VLAN, to determine whether said port is a single forwarding port with respect to said particular VLAN, wherein any edge port is considered a forwarding port. If yes, the port creates and transmits a de-activation message to the associated port at a neighbor node. The neighbor node repeats the procedure and, if the conclusions are the same, also creates and transmits its de-activation message.

In a similar manner, after any change in the network topology, all switching nodes of the changed topology should check their assigned forwarding ports and exchange messages if necessary.

It should be noted, that the check procedure includes checking the ports with respect to any VLAN to which the ports may be assigned. Thus, the procedure leads to elimination of all dead ends of the topology and thus to the maximal economy of the network bandwidth.

FIGS. 4a and 4b illustrate, in more detail, how the messages pass via the network when the proposed protocol reveals "dead ends" in a changed network topology.

For example, FIG. 4a illustrates the switching nodes A,B, C,D,E,F,G,H,I of the STP network topology 30 shown in FIG. 3. Four ports of each node of the nodes are shown by circles. Let FIG. 4a reflect the STP tree with respect to VLAN1, in which all ports of the nodes were initially assigned to VLAN1. Let the permanent ports (edge ports) be marked with the hatched pattern, while simple forwarding ports, active in the new topology, are double-hatched.

After a topology change timer limit expires, switches F,G,I recognize that they only have a single forwarding point that is assigned to VLAN1. F,G and I each send a de-activation message PDU "deactivate VLAN1" to their designated nodes (switches), i.e., E and H respectively. As part of the procedure, ports F1, G1, I1 are deactivated with respect to VLAN1. Switch E then deactivates VLAN1 on port 2 and port 4, as soon as each PDU is received and processed from G and F respectively. Switch E will follow the same procedure similarly as soon as it recognizes that E1 is a single forwarding port with respect to VLAN1. Switch H immediately deactivates VLAN1 on port 2. Node H, in turn, since its port H1 becomes a single forwarding port, follows the same procedure similarly (i.e., deactivates H1 and forwards another PDU towards node A). Optionally, the message "deactivate VLAN . . ." can be implemented as a single message for a particular port with respect to all VLANs that need to be deactivated at that port. However, the topology 30 is illustrated only with respect to VLAN1.

FIG. 4b illustrates results of the VLAN1 pruning procedure. Due to the messages which were shown in FIG. 4a, nodes H, I, F, G, A and E are deactivated, i.e. neither of their ports is now assigned to VLAN1.

Switch C deactivates VLAN1 on port 2, but does not include VLAN1 in the message to be sent to node B because VLAN1 is not deactivated on port 4.

Finally, VLAN1 is configured as active only on switches D_C_B which are needed to connect edge ports at D and B, and only on the required ports.

In the analogous way, due to the topology change, VLAN2 will be configured on switches G-E-C-B-A-H (white semi-circles and circles, see FIG. 1), and de-activated (pruned) at other switches of the network which were active before the topology change. (The path between edge ports G3 and H3 has changed from G-E-C-I-H to G-E-C-B-A-H).

The described procedure can be applied, as a supplementary protocol, to an Ethernet network having any degree of complexity and connectivity.

At the end of the proposed procedure, the STP tree of the newly formed configuration will have active, with respect to a particular VLAN, only the switching nodes which, in the currently active STP topology, lie in the path connecting the terminal edge ports.

As a result, no extra traffic will flood irrelevant ports of the switching nodes, no extra data traffic will be sent to the deactivated nodes from their neighbor nodes, and consequently, the network will be freed from excessive traffic both early in the transition period, required for FDB-re-learning, and throughout the lifetime of a given new STP topology.

It should be noted that if, for any reason, another topology change occurs, the described pruning protocol should start only after resetting the initial assignments of switches/ports of the new topology to VLANs. In other words, any new optimization of the network should start not from the previously optimized one, but from the initial VLAN configuration.

It should be appreciated that other versions of the proposed technique could be proposed which are to be considered part of the invention as far as being covered by the claims that follow.

The invention claimed is:

1. A method for utilizing a Spanning Tree Protocol (STP) in an Ethernet network wherein a number of VLANs are defined and a plurality of Ethernet switching nodes are interconnected via their ports so that each of the ports is initially assigned to one or more VLANs, and each of the VLANs is intended to enable traffic between two or more edge ports, the method comprises:

upon establishing a new STP topology related to one or more VLANs, initiating a pruning procedure of a broadcast domain of at least one of said one or more VLANs to obtain a sub-tree for each pruned VLAN in the new STP topology, wherein each said sub-tree being bound by the edge ports assigned to the corresponding pruned VLAN, thereby eliminating broadcast traffic of each said pruned VLAN to any Ethernet switch extending beyond the obtained corresponding sub-tree;

the method comprising the following steps to be performed at each Ethernet switching node that is active in the new STP topology and with respect to each of said one or more VLANs:

a ensuring that ports of the Ethernet switching node that is active in the new STP topology, are assigned to said one or more VLANs according to an initial VLANs configuration;

b) counting forwarding ports assigned to a particular VLAN, being active according to the new STP topology;

c) if a port assigned to a particular VLAN is a single forwarding port for said particular VLAN at said node, de-activating said port with respect to said VLAN, thereby pruning said VLAN at said port and said node;

d) generating a de-activation message from each said single forwarding port of said node, the message indicating one or more VLANs de-activated at said port, and transmitting said de-activation message to a neighbor Ethernet switching node in the new STP topology;

e) de-activating the port of the neighbor Ethernet switch, that has received said de-activation message, with respect to said one or more VLANs indicated in the message;

f) repeating steps (b) to (e) at said neighbor node.

2. The method according to claim 1, wherein the new STP topology is the initial STP topology in the Ethernet network.

3. The method according to claim 1, wherein the new STP topology is a changed STP topology in the Ethernet network.

4. The method according to claim 1, wherein in the counting step, the edge ports are considered permanently forwarding ports.

5. The method according to claim 1, wherein said de-activation message is a PDU (Protocol Data Unit) message further provided with an indication of one or more particular VLANs with respect to which said port is de-activated.

6. The method according to claim 5, wherein the PDU message is a combined de-activation message listing all VLANs de-activated at said port.

7. The method according to claim 1, being initiated at each particular Ethernet switching node upon receiving a Topology Change Notification (TCN) and after expiring a topology change timer.

8. An Ethernet switch provided with means for performing the method according to claim 1.

9. A method for utilizing a Spanning Tree Protocol (STP) in an Ethernet network wherein a number of VLANs are defined and a plurality of Ethernet switching nodes are interconnected via their ports so that each of the ports is initially assigned to one or more VLANs, and each of the VLANs is intended to enable traffic between two or more edge ports, the method comprising the following step to be performed upon establishing a new STP topology in the network:

transmitting at least one de-activation message from at least one Ethernet switching node that is active in the new STP topology to a neighbor Ethernet switching node also being active in the new STP topology, indicating one or more VLANs de-activated with respect to a port transmitting said message, so as to allow that said one or more VLANs be de-activated at a port receiving said message, wherein the method comprises the following steps to be performed at each Ethernet switching node that is active in the new STP topology and with respect to each of said one or more VLANs:

a) ensuring that ports of the Ethernet switching node that is active in the new STP topology, are assigned to said one or more VLANs according to an initial VLANs configuration;

b) counting forwarding ports assigned to a particular VLAN, being active according to the new STP topology;

c) if a port assigned to a particular VLAN is a single forwarding port for said particular VLAN at said node, de-activating said port with respect to said VLAN, thereby pruning said VLAN at said port and said node;

d) generating said de-activation message from each said single forwarding port of said Ethernet switching node, the message indicating one or more VLANs de-activated at said port, for further transmitting said de-activation message to the neighbor Ethernet switching node in the new STP topology;

e) de-activating the port of the neighbor Ethernet switch that has received said de-activation message, with respect to said one or more VLANs indicated in the message;

repeating steps (b) to (e) at said neighbor node.

10. The method according to claim 9, wherein the new STP topology is the initial STP topology in the Ethernet network.

11. The method according to claim 9, wherein the new STP topology is a changed STP topology in the Ethernet network.

12. The method according to claim 9, wherein in the counting step, the edge ports are considered permanently forwarding ports.

13. The method according to claim 9, wherein said de-activation message is a PDU (Protocol Data Unit) message further provided with an indication of one or more particular VLANs with respect to which said port is de-activated.

14. The method according to claim 13, wherein the PDU message is a combined de-activation message listing all VLANs de-activated at said port.

15. The method according to claim 9, being initiated at each particular Ethernet switching node upon receiving a Topology Change Notification (TCN) and after expiring a topology change timer.

16. An Ethernet switch provided with means for performing the method according to claim 9.

* * * * *